(12) United States Patent
Shinohara et al.

(10) Patent No.: US 11,683,413 B2
(45) Date of Patent: *Jun. 20, 2023

(54) NUMBER MANAGEMENT SYSTEM, NUMBER MANAGEMENT METHOD, NUMBER MANAGEMENT DEVICE AND NUMBER MANAGEMENT PROGRAM

(71) Applicant: Nippon Telegraph and Telephone Corporation, Tokyo (JP)

(72) Inventors: Kenta Shinohara, Musashino (JP); Noritaka Horikome, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/623,057

(22) PCT Filed: Jul. 1, 2019

(86) PCT No.: PCT/JP2019/026048
§ 371 (c)(1),
(2) Date: Dec. 27, 2021

(87) PCT Pub. No.: WO2021/001875
PCT Pub. Date: Jan. 7, 2021

(65) Prior Publication Data
US 2022/0232125 A1    Jul. 21, 2022

(51) Int. Cl.
*H04M 3/42* (2006.01)
*H04L 9/32* (2006.01)
*H04L 101/65* (2022.01)

(52) U.S. Cl.
CPC .......... *H04M 3/42297* (2013.01); *H04L 9/32* (2013.01); *H04L 2101/65* (2022.05)

(58) Field of Classification Search
None
See application file for complete search history.

(56) References Cited

U.S. PATENT DOCUMENTS 10,171,992 B1 * 1/2019 Viswanathan ........ H04M 15/49
2019/0012623 A1   1/2019 Habuchi et al.
(Continued)

FOREIGN PATENT DOCUMENTS

CN    109241181    1/2019
JP    2017200196   11/2017
(Continued)

OTHER PUBLICATIONS

[No Author Listed] [online], "About Handling Number Portability," Ministry of Internal Affairs and Communications, Jul. 28, 2016, retrieved from URL <http://www.soumu.go.jp/main_content/000433169.pdf>, 43 pages (with English Translation).
(Continued)

*Primary Examiner* — Antim G Shah
(74) *Attorney, Agent, or Firm* — Fish & Richardson P.C.

(57) ABSTRACT

A number management unit (11) of a number management system (1) generates a transaction using number portability information including a hashed telephone number and connection destination information, newly generates and approves a block using multiple transactions, and stores the block in a number database (13) as a blockchain. A number resolution unit (12) hashes a telephone number that is a query target using a hash function, searches transactions in a blockchain using the hashed telephone number as a key, and sends connection destination information corresponding to the telephone number that is the query target as a response.

12 Claims, 12 Drawing Sheets

(56) References Cited

U.S. PATENT DOCUMENTS

| | | | |
|---|---|---|---|
| 2019/0261165 A1* | 8/2019 | Subramaniam | H04W 8/28 |
| 2019/0268466 A1 | 8/2019 | Inoue | |
| 2020/0050782 A1* | 2/2020 | Song | G06F 21/64 |

FOREIGN PATENT DOCUMENTS

| | | |
|---|---|---|
| JP | 2019016024 | 1/2019 |
| KR | 20090058339 | 6/2009 |
| WO | WO 2018020943 | 1/2018 |

OTHER PUBLICATIONS

[No Author Listed] [online], "TTC JJ-90.31, Common interconnection interface for carrier ENUM Version 4.0," Telecommunication Technology Committee, General Incorporated Association, Aug. 29, 2018, retrieved from URL <https://www.ttc.or.jp/application/files/4715/5418/5873/JJ-90.31v4.pdf>, 45 pages (with English Translation).

* cited by examiner

NUMBER MANAGEMENT SYSTEM, NUMBER MANAGEMENT METHOD, NUMBER MANAGEMENT DEVICE AND NUMBER MANAGEMENT PROGRAM

CROSS-REFERENCE TO RELATED APPLICATIONS

This application is a National Stage application under 35 U.S.C. § 371 of International Application No. PCT/JP2019/026048, having an International Filing Date of Jul. 1, 2019. The disclosure of the prior application is considered part of the disclosure of this application, and is incorporated in its entirety into this application.

TECHNICAL FIELD

The present invention relates to a number management system, a number management method, a number management apparatus, and a number management program, in which blockchain technology is utilized in order to realize number portability in a telephone line network.

BACKGROUND ART

Conventionally, in an IP (Internet Protocol) network, an ENUM (E.16 4 Number Mapping) system has been proposed as a mechanism by which an apparatus in a communication provider network (an SIP (Session Initiation Protocol) server, etc.) performs association of a telephone number and a URI (Uniform Resource Identifier). In the ENUM system, an SIP server that is installed in a network of a communication provider performs routing based on information of a connection destination by querying information of a connection destination (IP address, domain name, etc.) for a telephone number of a terminal (IP telephone, etc.) serving as a connection destination to the ENUM server (see NPL 1).

Also, a number portability scheme by which a fixed telephone number can be carried around freely between communication providers in an IP network accompanying a transition from a PSTN (Public Switched Telephone Network) to an IP network has been considered (see NPL 2).

In the number portability scheme according to NPL 2, a number database (number DB) for performing centralized management of number portability information of communication providers is included in the above-described ENUM server (ENUM authority server), and due to the SIP server of each communication provider accessing the ENUM server of the communication provider to which the SIP server belongs, the SIP server resolves whether or not the telephone numbers have been transferred (ported out) to another network, and performs communication by acquiring information of the connection destination (connection destination information).

Specifically, as shown in FIG. 11, in an ENUM system 1000, in the case where a telephone number (incoming number) attached to a request from an SIP server is a query for a telephone number managed in the local network, the ENUM server sends the connection destination information as a response from the number DB of the ENUM server (see reference sign α in FIG. 11). On the other hand, if the telephone number attached to the request is a telephone number managed by an ENUM server of another network, a request is performed to the ENUM server of the other network managing the telephone number, and the obtained connection destination information is sent as a response to the request source (see reference sign β in FIG. 12).

Thus, with the current Japanese telephone line network, an ENUM system is employed in order to realize number portability, and as a specific mechanism therefor, in a routing scheme, a "transmitting-side DB reference scheme", that is, a scheme in which the provider of the call source realizes connection of the call even if the DB (number database) of another provider is referenced is employed. Also, in the database scheme, an "on-premises separate DB scheme", that is, a scheme in which each company possesses its own number DB, is employed.

CITATION LIST

Non Patent Literature

[NPL 1] "Common interconnection interface for carrier ENUM", TTC JJ-90.31, [online], Telecommunication Technology Committee, Aug. 29, 2018, [searched for on Jun. 13, 2019], Internet <URL: https://www.ttc.or.jp/application/files/4715/5418/5873/JJ-90.31v4.pdf>

[NPL 2] "Handling number portability", [online], Ministry of Internal Affairs and Communications, Jul. 28, 2016, [searched for on Jun. 13, 2019], Internet <URL: http://www.soumu.go.jp/main content/000433169.pdf>

SUMMARY OF THE INVENTION

Technical Problem

As described above, in a conventional ENUM system, the "transmitting-side DB reference scheme" is employed as the routing scheme, and the "on-premises separate DB scheme" is employed as the database scheme. However, in the number portability scheme in which this ENUM system is employed, there is a problem in that when an ENUM server of a certain communication provider breaks down, it is no longer possible to resolve numbers for the number range managed by that communication provider.

Also, in the current state, only large-scale communication providers (large-scale providers) have ENUM servers, and small-scale communication providers (small-scale providers) have the ENUMs of large-scale providers manage connection destination information corresponding to telephone numbers (hereinafter referred to as "number information"), and thus the following problems are also present.

(1) High reliability is required in order to construct an ENUM system. For this reason, a large cost is required, and the burden is large for a small-scale provider.

(2) When a small-scale provider wants to perform updating of data, the small-scale provider needs to make a request to a large-scale provider to perform a change. For this reason, there is no guarantee that updating can be performed in real time.

(3) When a communication provider withdraws, there is a risk that it will no longer be possible to resolve the portability destinations of the numbers being managed by that communication provider.

There is also a problem in that if all providers are allowed to possess the database through some method in order to solve the above-described problems, the communication providers can easily acquire which communication providers the telephone number contractors are contracted with by merely referencing their own databases, and the risk of information leakage resulting from loss or theft or the like of storage devices possessed by the communication providers increases.

The present invention was made in view of such background circumstances, and the present invention aims to improve availability and confidentiality of number portability information that is to be used in an ENUM system.

Means for Solving the Problem

A number management system according to the present invention is a number management system including a plurality of number management apparatuses for managing number portability information including a telephone number and connection destination information for the telephone number, in which the plurality of number management apparatuses each include a number management unit configured to manage the number portability information as a blockchain, and a number resolution unit configured to send the connection destination information corresponding to a query telephone number as a response, the number management unit includes a request reception unit configured to receive a number update request including the number portability information, a transaction generation unit configured to generate a transaction including hashed number information obtained by hashing the telephone number using a predetermined hash function and the connection destination information, a block suggestion unit configured to acquire the transactions generated according to a plurality of said number update requests, generate a newly-suggested block including a transaction group obtained by aggregating the acquired plurality of transactions, and transmit the generated suggested block to the respective plurality of number management apparatuses creating the blockchain, and a block approval unit configured to receive the suggested block, approve the suggested block by confirming a predetermined normality of the suggested block, and store the suggested block by connecting the suggested block to a block stored as the blockchain in a storage unit, and the number resolution unit includes a query reception unit configured to receive a query request including the query telephone number, a hash computation unit configured to generate hashed query information by hashing the query telephone number using the hash function, and a data management unit configured to search transactions in the blockchain using the hashed query information as a key and send the connection destination information corresponding to the query telephone number as a response.

Effects of the Invention

According to the present invention, it is possible to improve availability and confidentiality of number portability information to be used in an ENUM system.

DESCRIPTION OF EMBODIMENTS

Next, a number management system 1 and the like according to a mode for implementing the present invention (hereinafter referred to as "present embodiment") will be described.

Figure 1:
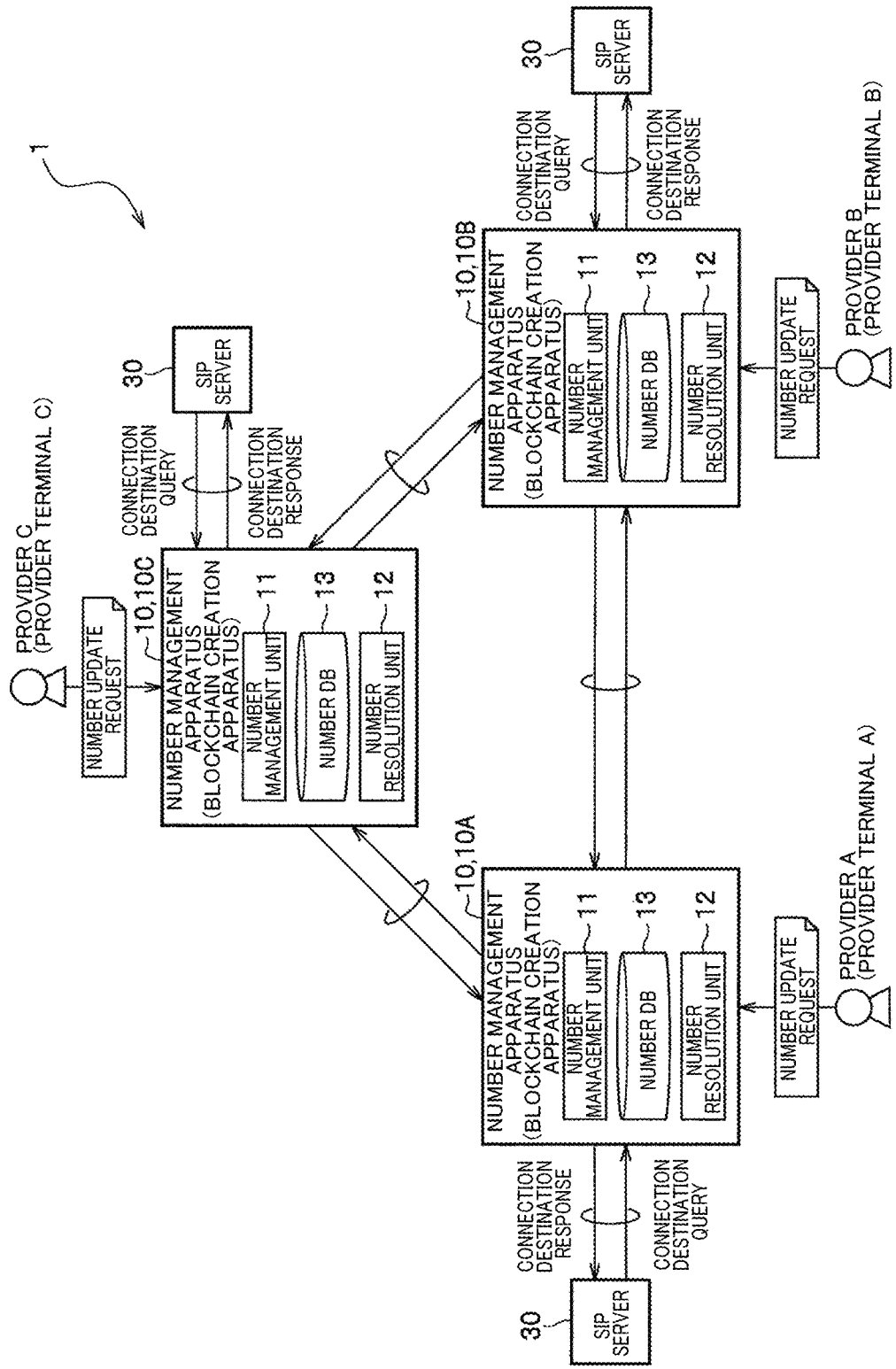
FIG. 1 is a diagram showing an overall configuration of a number management system according to the present embodiment.

FIG. 1 is a diagram showing an overall configuration of the number management system 1 according to the present embodiment.

As shown in FIG. 1, the number management system 1 is constituted due to number management apparatuses 10 serving as blockchain creation apparatuses of communication providers (written as "providers" in the drawings) being communicably connected to each other. In FIG. 1, as an example, a number management apparatus (blockchain creation apparatus) 10A of a communication provider A, a number management apparatus (blockchain creation apparatus) 10B of a communication provider B, and a number management apparatus (blockchain creation apparatus) 10C of a communication provider C are shown. The number of number management apparatuses 10 is not limited to this, and it is sufficient that multiple number management apparatuses (blockchain creation apparatuses) 10 are communicably connected to each other.

The information that is managed in this number management system 1 is information for number portability (hereinafter referred to as "number portability information"). Number portability is a mechanism by which even if a communication provider being used by a user is changed, the user can use the service of the changed communication provider without changing his or her telephone number. Each communication provider performs number resolution by holding number portability information as information obtained by updating the connection destination information for the number information of that provider (the telephone numbers and the connection destination information corresponding to the telephone numbers) to connection destination information addressed to another provider.

In the present embodiment, the number management apparatus 10 of each communication provider stores the number portability information of all communication providers that participate in the blockchain in a number database (DB) 13 as a blockchain. Also, the number management apparatus 10 includes a function (number resolution function) of responding to a query (request) for connection destination information from an SIP server or the like. That is, the number management apparatus 10 includes a number management unit 11 and a number resolution unit 12. The number management unit 11 manages number portability information including a telephone number and connection destination information for the telephone number as a blockchain. The number resolution unit 12 provides connection destination information corresponding to a query telephone number in response to a query for a connection destination corresponding to a given query telephone number.

Note that in the present embodiment, the number management apparatuses 10 that participate in the blockchain are premised not on a publicly-open type of blockchain in which anyone can participate, which is used in financial transactions, but on a Permissioned type of blockchain using a service in which the blockchain is used among limited members. For example, the members participating in the blockchain are communication providers to which telephone numbers have been dispensed from the Ministry of Internal Affairs. However, there is no limitation to such specific communication providers, and specific individuals such as those shown in later-described Variation 5 may also be included.

<Number Management Apparatus>

Next, the number management apparatus 10 according to the present embodiment will be described.

The number management apparatus 10 is a blockchain creation apparatus that manages number portability information of members (communication providers) that participate in the blockchain. This number management apparatus 10 is connected to a number management apparatus 10 of another communication provider that participates in the blockchain and is connected to a system of a communication provider (e.g., a provider terminal). Note that the number management apparatuses 10 (10A, 10B, 10C) include the same functions, which will be described hereinafter.

Figure 2:
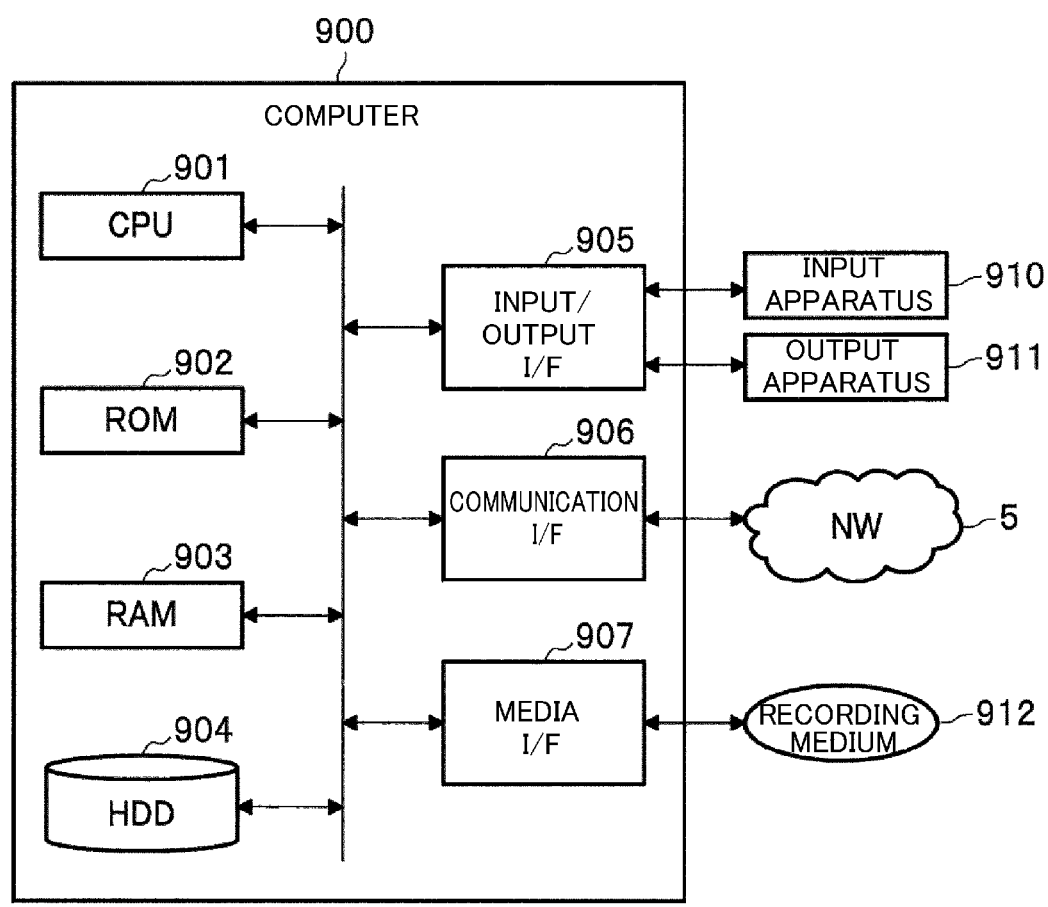
FIG. 2 is a block diagram showing an example of a hardware configuration of a computer that realizes functions of a number management apparatus according to the present embodiment.

FIG. 2 is a hardware configuration diagram showing an example of a computer 900 that realizes the functions of the number management apparatus 10 according to the present embodiment. The computer 900 includes a CPU (Central Processing Unit) 901, a ROM (Read Only Memory) 902, a RAM (Random Access Memory) 903, an HDD (Hard Disk Drive) 904, an input/output I/F (Interface) 905, a communication I/F 906, and a media I/F 907.

The CPU 901 operates based on the program stored in the ROM 902 or the HDD 904 and performs control using the units shown in FIG. 1 (number management unit 11, number resolution unit 12). The ROM 902 stores a boot program to be executed by the CPU 901 during startup of the computer 900, a program according to the hardware of the computer 900, and the like.

The CPU 901 controls an input apparatus 910 such as a mouse or a keyboard, and an output apparatus 911 such as a display or a printer, via the input/output I/F 905. The CPU 901 acquires data from the input apparatus 910 and outputs the generated data to the output apparatus 911, via the input/output I/F 905.

The HDD 904 (storage apparatus) stores programs to be executed by the CPU 901 and data (number database 13, etc.) to be used by the programs. The communication I/F 906 receives data from another apparatus (not shown) (e.g., another number management apparatus 10, an SIP server 30, etc.) via a communication network (e.g., a network (NW) 5) and outputs the received data to the CPU 901, and transmits the data generated by the CPU 901 to another apparatus via a communication network.

The media I/F 907 reads a program or data stored in a recording medium 912 and outputs it to the CPU 901 via the RAM 903. The CPU 901 loads a program for target processing from the recording medium 912 on the RAM 903 via the media I/F 907 and executes the loaded program. The recording medium 912 is an optical recording medium such as a DVD (Digital Versatile Disc) or a PD (Phase change rewritable Disk), a magneto-optical recording medium such as an MO (Magneto Optical disk), a magnetic recording medium, a conductor memory tape medium, a semiconductor memory, or the like.

For example, if the computer 900 functions as the number management apparatus 10 according to an embodiment, the CPU 901 of the computer 900 realizes the functions of the number management unit 11 and the number resolution unit 12 of the number management apparatus 10 by executing the program loaded on the RAM 903. Also, the data in the RAM 903 is stored in the HDD 904. The CPU 901 reads a program for target processing from the recording medium 912 and executes the program. In addition, the CPU 901 may also load the program for the target processing from another apparatus via a communication network (network 5).

<Number Management Unit>

Figure 3:
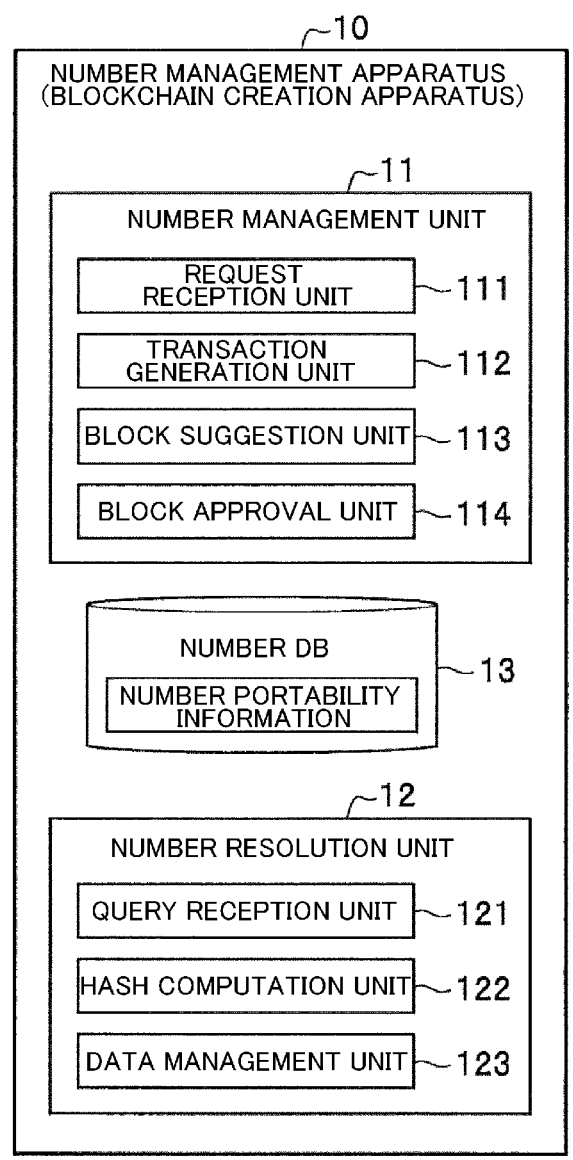
FIG. 3 is a block diagram showing a functional configuration of a number management apparatus according to the present embodiment.

FIG. 3 is a block diagram showing a functional configuration of the number management apparatus 10. As shown in FIG. 3, the number management apparatus 10 is constituted by including the number management unit 11, the number resolution unit 12, and the number database 13. Furthermore, the number management unit 11 is constituted by including a request reception unit 111, a transaction generation unit 112, a block suggestion unit 113, and a block approval unit 114.

The request reception unit 111 receives a number update request from a communication provider (provider terminal) or the like via the input/output unit. The telephone number (e.g.: 0312345678) that is the target of number portability, and connection destination information of the other communication provider that is the number change destination (hereinafter referred to also as "accepting provider information" in some cases) (e.g.: 0312345678@abc.ne.jp) are included in the number update request. The number portability information is constituted by including the telephone number and the accepting provider information that is the connection destination information of the change destination (see FIGS. 4 to 6).

Upon receiving a number update request, the request reception unit 111 generates a number update suggestion that includes the telephone number and the accepting provider information, and outputs the number update suggestion to the transaction generation unit 112.

Upon receiving the transaction generated by the transaction generation unit 112, the request reception unit 111 transmits a number update instruction including the received transaction to the block suggestion unit 113 of the number management apparatus 10 determined based on the predetermined logic (block suggestion unit selection logic) among the number management apparatuses 10 creating the blockchain. The transaction is generated using the number portability information as information that is managed and stored in the blockchain. The predetermined logic, for example, a given number management apparatus 10 (a number management apparatus 10 that has a high processing capability, is adjacent distance-wise, and the like) in advance, and may also randomly determine the number management apparatus 10. The block suggestion unit 113 of the number management apparatus 10 may also be included in candidates for determination.

Upon receiving the number update suggestion, the transaction generation unit 112 confirms the normality of the information (number portability information) of the telephone number and the accepting provider information, which is the connection destination information of the change destination, the information being the suggestion content of the number update suggestion.

The confirmation of the normality performed by the transaction generation unit 112 is, for example, performing authentication of whether or not the telephone number is in a stipulated format (number of digits, etc.), or whether or not the accepting provider information is in a stipulated format.

If the normality is confirmed, the transaction generation unit 112 generates a transaction that is managed and stored in a blockchain for the number portability information. Then, the transaction generation unit 112 outputs a number update suggestion response including the generated transaction to the request reception unit 111.

Here, the transaction generation unit 112 hashes the telephone number in the number portability information using a predetermined hash function and generates a transaction. That is, the transaction generation unit 112 generates a transaction (see FIG. 4) including hashed number information (hash value) obtained by hashing the telephone number using a predetermined hash function, and connection destination information. The hash function to be used by the transaction generation unit 112 is also shared by a later-described hash computation unit 122 of the number resolution unit 12. Due to hashing the telephone number in this manner, it is no longer possible to find out the correspondence between the telephone number and the connection destination information by looking at the transaction.

Note that the transaction generation unit 112 may also not output the generated transaction to the request reception unit 111, and may determine the block suggestion unit 113 of one of the number management apparatuses 10 creating the blockchain based on the predetermined logic (block suggestion unit selection logic), and transmit the number update instruction including the generated transaction to the determined block suggestion unit 113.

The block suggestion unit 113 aggregates the number update instructions received from the number management apparatuses 10 creating the blockchain, and generates a block including multiple transactions (hereinafter referred to as a "transaction group"). This block includes the aggregated transactions (transaction group) and a hash value (a later-described "previous block hash value") calculated using the transaction group of the most recent block at the current time among the blocks stored as the blockchain in the number database 13.

Figure 4:
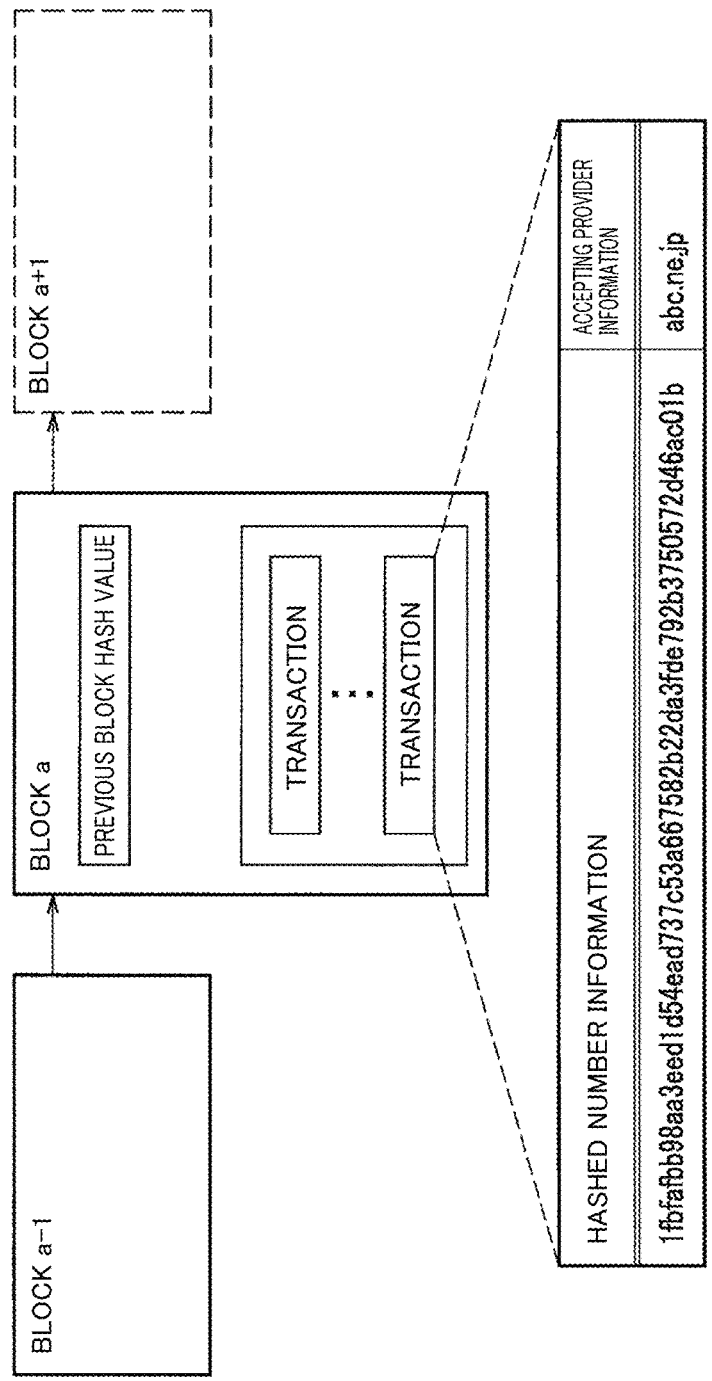
FIG. 4 is a diagram showing blocks stored as a blockchain in a storage unit of each number management apparatus.
Figure 5:
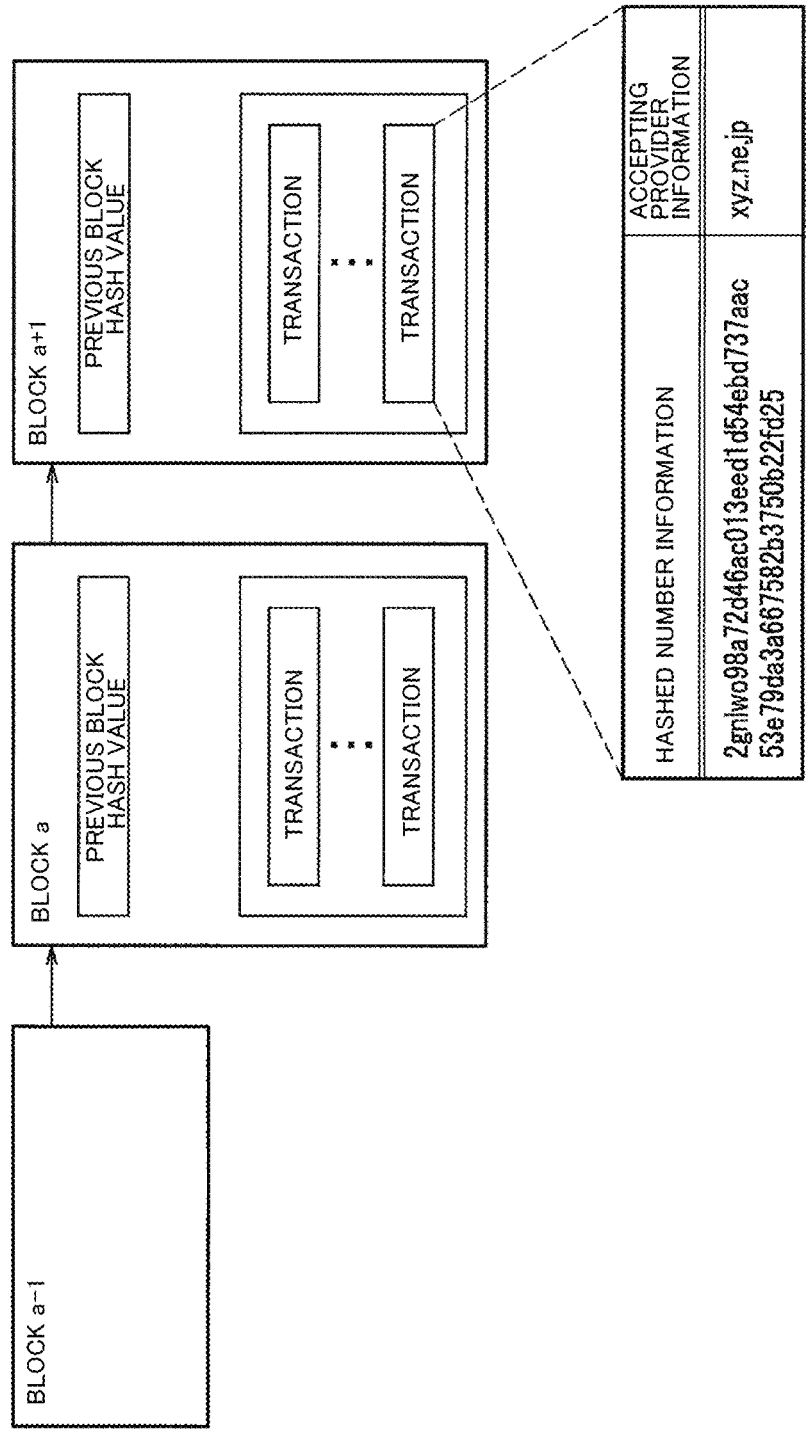
FIG. 5 is a diagram showing blocks stored as a blockchain in a storage unit of each number management apparatus.

FIG. 4 is a diagram showing blocks stored as a blockchain in a storage unit of each number management apparatus 10.

Each block stores information on a transaction group and information on a "previous block hash value". In the example shown in FIG. 4, the most recent (last-connected) block a at the current time stores a hash value (prior block hash value), which is a value calculated using a hash function on the transaction group of the block a−1, which is the block that is connected immediately prior thereto, and information on the most recent transaction group at that time.

When a suggested block is to be generated, the block suggestion unit 113 uses a hash function to calculate the hash value of the transaction group for the most recent block (block a). Then, the block suggestion unit 113 generates, as the suggested block (block a+1), a block including the calculated hash value (previous block hash value) and the newly-aggregated transaction group.

Upon generating the newly-suggested block (block a+1), the block suggestion unit 113 transmits a number update approval request including that block to the block approval units 114 of the number management apparatuses 10 creating the blockchain.

Returning to FIG. 3, upon receiving the number update approval request, the block approval unit 114 confirms the normality of the block included in the number update approval request. The confirmation of the normality is performed as follows, for example. The block approval unit 114 calculates a hash value using the transaction group in the most recent block (block a) of the blockchain stored in the storage unit of the number management apparatus 10. Then, the block approval unit 114 determines whether or not the previous block hash value included in the newly-suggested block a+1 in the number update approval request and the calculated hash value match each other. Then, if the hash values match each other, the block approval unit 114 approves the block as a normal block, connects the block as the next block (block a+1) in the blockchain to the block a, and stores the result (see FIG. 5).

The same transaction (number portability information) is stored in the number databases 13 of all of the number management apparatus 10 due to the suggested block being approved (the normality being confirmed) by the block approval units 114 of the number management apparatuses 10 creating the blockchain.

<Number Resolution Unit>

Returning to FIG. 3, the number resolution unit 12 will be described. In the ENUM system, the number resolution unit 12 realizes a function (ENUM server number resolution function) of responding to a query (request) regarding connection destination information from an SIP server or the like.

As shown in FIG. 3, the number resolution unit 12 is constituted by including a query reception unit 121, a hash computation unit 122, and a data management unit 123.

The query reception unit 121 receives a query request requesting connection destination information (accepting provider information) of a given telephone number from an SIP server or the like. The query request includes a telephone number that is the query target of the current instance (hereinafter referred to as "query telephone number"). Also, the query reception unit 121 transmits the connection destination information received from the data management unit 123 to the SIP server or the like, which is the query source, as a query response.

The hash computation unit 122 hashes the query telephone number using a predetermined hash function. Hereinafter, the hashed query telephone number will be referred to as "hashed query information". The predetermined hash function is a hash function that is used by the transaction generation unit 112 to hash the telephone number (used to generate the hashed telephone number).

The data management unit 123 searches transactions in the blockchain using the hashed query information generated by the hash computation unit 122 as a key, and sends the connection destination information corresponding to the query telephone number as a response. That is, the data management unit 123 searches the hashed number information of the transaction of each block recorded in the number database 13, and extracts the transaction in which the hashed number information and the hashed query information match each other. Then, the data management unit 123 outputs the connection destination information of the extracted transaction to the query reception unit 121.

<Processing Performed by Number Management Unit>

Figure 6:
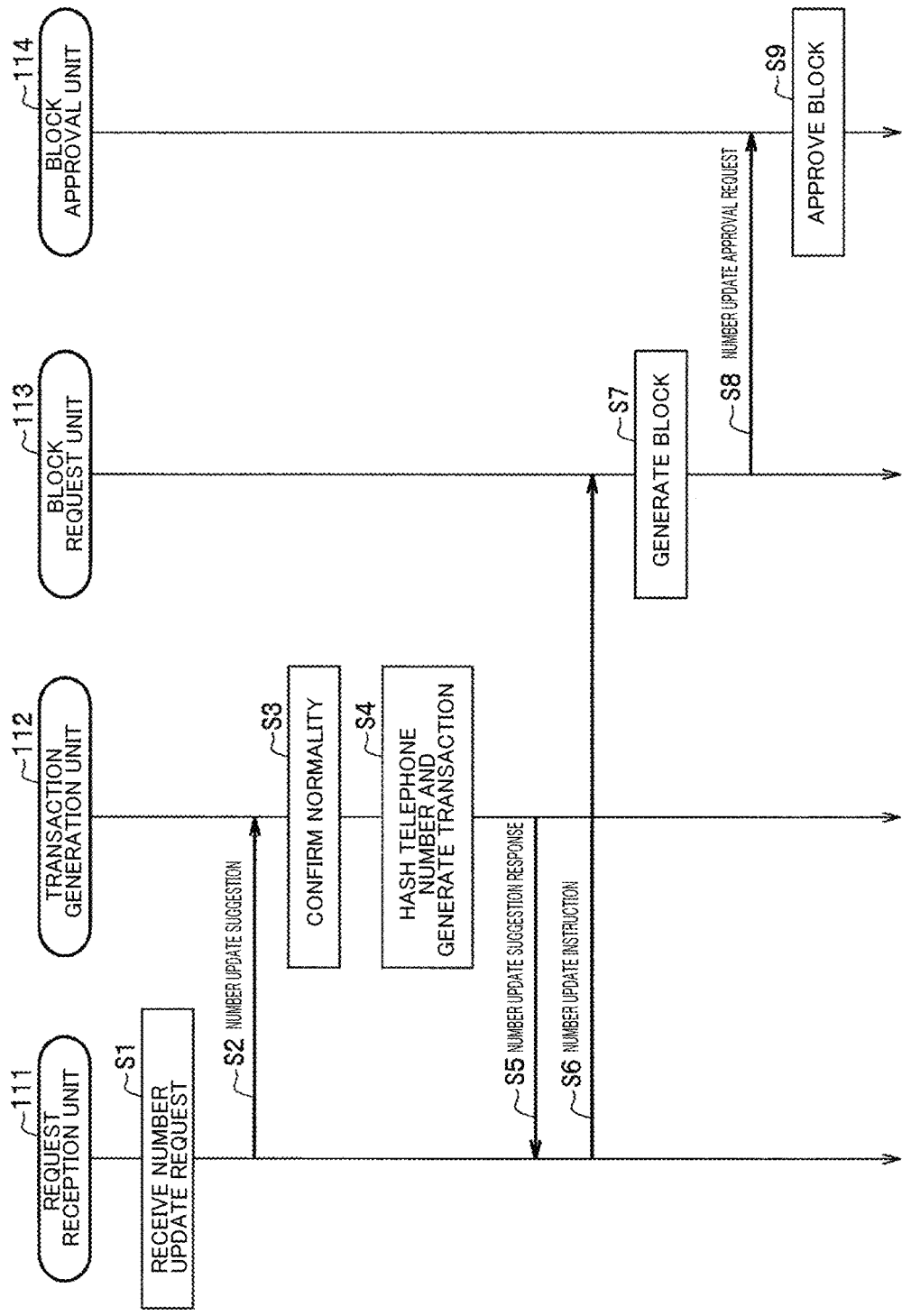
FIG. 6 is a sequence diagram showing a flow of processing performed by a number management unit according to the present embodiment.

Next, a flow of processing performed by the number management unit 11 according to the present embodiment will be described. FIG. 6 is a sequence diagram showing a flow of processing performed by the number management unit 11 according to the present embodiment.

First, one of the number management apparatuses 10 included in the number management system 1 (e.g., the number management apparatus 10A) receives a number update request from a communication provider (communication provider terminal) or the like (step S1). The number update request includes number portability information composed of the target telephone number (e.g., "0312345678") and connection destination information (accepting provider information) of another communication provider serving as the change destination for the telephone number (e.g., "0312345678@abc.ne.jp"). Note that the communication provider (communication provider terminal) or the like may also transmit the number update request to the number management apparatus 10 to which the communication provider belongs, and may also transmit the number update request to the number management apparatus 10 belonging to another communication provider creating the blockchain. Thus, for example, the number update request may also be transmitted from a provider terminal A of the communication provider A to a number management apparatus 10B of a communication provider B.

Next, the request reception unit 111 of the number management apparatus 10 that received the number update request extracts the number portability information (the phone number and the accepting provider information serving as the change destination) included in the number update request, and outputs a number update suggestion including the number portability information to the transaction generation unit 112 of the number management apparatus 10 (step S2).

Upon receiving the number update suggestion, the transaction generation unit 112 confirms the normality of whether or not the information on the telephone number and the accepting provider information serving as the change destination (number portability information), which is the suggestion content of the number update suggestion, matches a predetermined regulation (format) (step S3).

If the normality of the number portability information is confirmed, the transaction generation unit 112 generates the hashed number information by hashing the telephone number in the number portability information and generates a transaction including the hashed number information and the connection destination information (step S4). Then, the transaction generation unit 112 outputs the number update suggestion response including the generated transaction to the request reception unit 111 (step S5).

Note that if the normality cannot be confirmed, the transaction generation unit 112 ends the processing. At this time, the transaction generation unit 112 may also send a response indicating that the normality was not confirmed to the communication provider that transmitted the number update request (communication provider terminal) via the request reception unit 111.

Next, the request reception unit 111 acquires a transaction included in the number update suggestion response and transmits a number update instruction including the acquired transaction to the block suggestion unit 113 of the number management apparatus 10 (e.g., number management apparatus 10B) determined based on the predetermined logic (block suggestion unit selection logic) among the number management apparatuses 10 creating the blockchain (step S6).

The block suggestion unit 113 of the number management apparatus 10 that received the number update instruction aggregates the transaction included in the received number update instruction and the transactions included in the other number update instructions received in addition thereto, and generates a block (suggested block) that includes multiple transactions (transaction group) (step S7). At this time, the block suggestion unit 113 calculates the hash value of the transaction group for the most recent block (block a in FIG. 4) and includes the calculated hash value in the generated block as the "previous block hash value".

Then, the block suggestion unit 113 transmits a number update approval request including the generated block (suggested block) to the block approval units 114 of the number management apparatuses 10 (10A, 10C) creating the blockchain (step S8). Note that at this time, the block suggestion unit 113 outputs the number update approval request to the block approval unit 114 of the number management apparatus 10B as well.

Upon receiving the number update approval request, the block approval units 114 of the number management apparatuses 10 approve the block by confirming the normality of the block included in the number update approval request (step S9). Then, the block approval unit 114 stores the approved block in the number database 13 connected to the block a as the next block (block a+1 in FIG. 5) of the blockchain stored in the number management apparatus 10, and ends the processing.

Note that the block approval unit 114 performs the confirmation of the normality by determining whether or not the values of the "previous block hash value" included in the block and the hash value calculated using the transaction group of the most recent block (block a of FIG. 4) stored in the storage unit of the number management apparatus 10 match each other, and if they match, confirming that there is no tampering and the like and the state is normal.

<Processing Performed by Number Resolution Unit>

Figure 7:
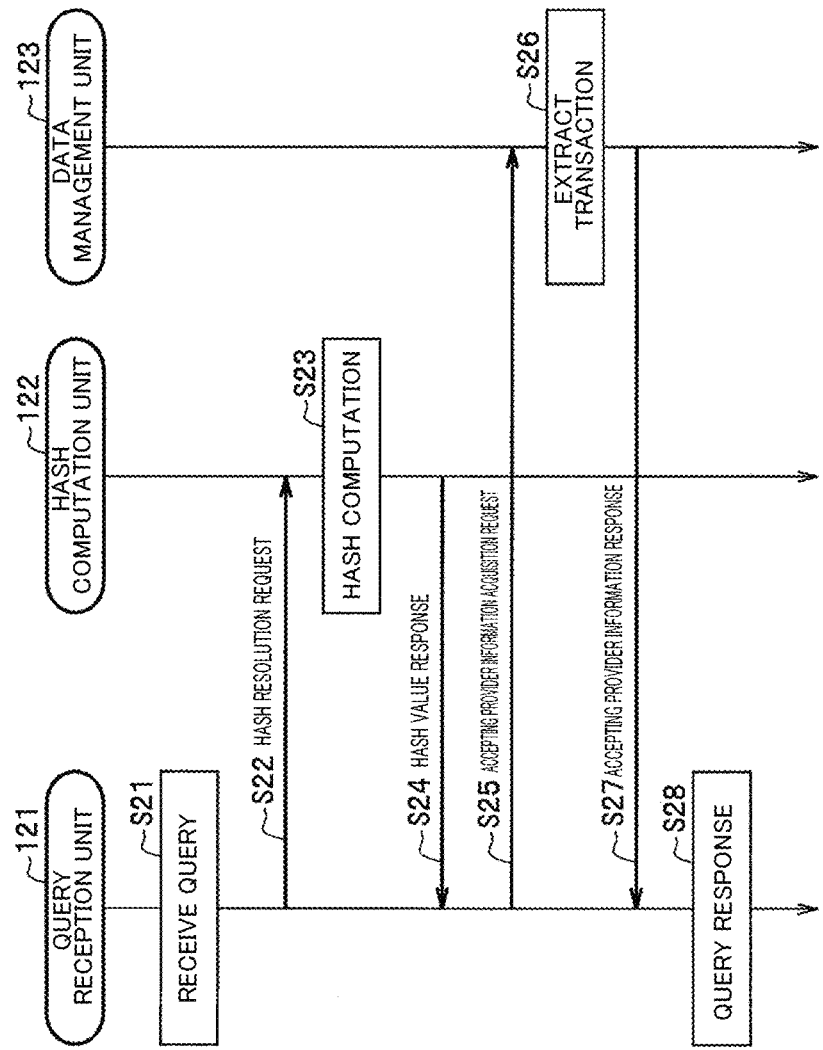
FIG. 7 is a sequence diagram showing a flow of processing performed by a number resolution unit according to the present embodiment.

Next, a flow of processing performed by the number resolution unit 12 according to the present embodiment will be described. FIG. 7 is a sequence diagram showing a flow of processing performed by the number resolution unit 12 according to the present embodiment.

First, one (e.g., the number management apparatus 10A) of the number management apparatuses 10 included in the number management system 1 receives a query request for connection destination information from an SIP server or the like (step S21). The query request includes a telephone number (query telephone number) that is a query target. Next, the query reception unit 121 of the number management apparatus 10 that received the query request extracts the query telephone number included in the query request and outputs a hash resolution request requesting the hashing of the query telephone number to the hash computation unit 122 of the number management apparatus 10 (step S22).

Upon receiving the hash resolution request from the query reception unit 121, the hash computation unit 122 hashes the query telephone number using a predetermined hash function (hash function shared by the number management system 1) (hash computation) and generates the hashed query information (step S23). Next, the hash computation unit 122 transmits a hash value response including the generated hashed query information (hash value) to the query reception unit 121 (step S24).

The query reception unit 121 transmits the accepting provider information acquisition request including the hashed query information to the data management unit 123 (step S25). The data management unit 123 searches the transaction of each block in the number database 13 using the hashed query information as a key, and extracts a transaction having a hashed telephone number that matches the hashed query information (step S26). Then, the data management unit 123 transmits an accepting provider information response including the connection destination information of the extracted transaction to the query reception unit 121 (step S27).

Then, the query reception unit 121 transmits a query response including the connection destination information corresponding to the query telephone number to the SIP server and the like, which is the query source (step S28).

In this manner, each number management apparatus (blockchain creation apparatus) 10 of the number management system 1 according to the present embodiment can store not only the number portability information relating to the telephone numbers managed by the number management apparatus 10, but also the number portability information of all members (communication providers) that participate in the blockchain. Accordingly, for example, even if the number management apparatus 10 of a given communication provider breaks down, number resolution can be continued due to the number portability information of all members (communication providers) that participate in the blockchain being stored in the number management apparatuses 10 of the other communication providers. Accordingly, it is possible to improve the availability of the number portability information that is used in the ENUM system.

Also, by providing each number management apparatus 10 with the function of an ENUM server, the number portability information of all members that participate in the blockchain is stored in the other number management apparatuses 10 even if one of the number management apparatuses 10 breaks down, and therefore it is possible to eliminate the need to increase the degree of reliability for the number management apparatuses 10 including the functions of individual ENUM servers compared to an ENUM server of a conventional ENUM system. Accordingly, the cost can be reduced. Also, during updating of the number portability information, a small-scale provider need only transmit the number update request to one of the multiple number management apparatuses 10 creating the blockchain, and therefore it is possible to eliminate the need to request that a specific large-scale provider performs the change. Accordingly, it is possible to remove a barrier of entry to a telephone line network for a small-scale provider.

Also, due to a portion (telephone number) of the number portability information being hashed and stored in the blockchain as in the present embodiment, it is possible to increase the confidentiality of the number portability information.

For example, if the number portability information is not hashed, all of the number information held by the providers (the telephone numbers and accepting provider information of the telephone numbers) are distributed in plain text (unencrypted data) to all of the providers connected by the blockchain. For this reason, a provider can easily acquire which providers the telephone number contractors are contracted with by merely referencing the data of their own blockchain (number database 13). In terms of the properties of a service called number portability, referencing of data in a blockchain in order to reference the provider information of a call destination during an outbound telephone call is allowed, but applications other than resolution of a telephone call destination, such as use of the data for the purpose of recruiting a user who has been accepted by another provider do not match the original intent of number portability and are problematic. As in the present embodiment, it is possible to prevent providers from being able to easily find out which providers telephone number contractors are contracted with by hashing a portion of the number portability information.

Also, for example, in a case where the number portability information is not hashed, if the data in the blockchain (number database 13) leaks to a third party during exchange between providers of the block information, or due to loss, theft, or the like of a storage device possessed by the providers, there is a risk that the number information will be misused. By hashing a portion of the number portability information as in the present embodiment, even if the data in the blockchain leaks, there is no more risk that the number portability information will leak to a third party as long as the hash function used in the hashing of the telephone number is not specified.

<<Variation 1>>

Next, Variation 1 of the number management system 1 according to the present embodiment will be described.

In the above description, it was assumed that the hash function to be used for hashing the telephone number is fixed, but the hash function may also be changed at any timing. That is, the transaction generation unit 112 may also change the hash function to be used for hashing the telephone number at any timing.

Figure 8:
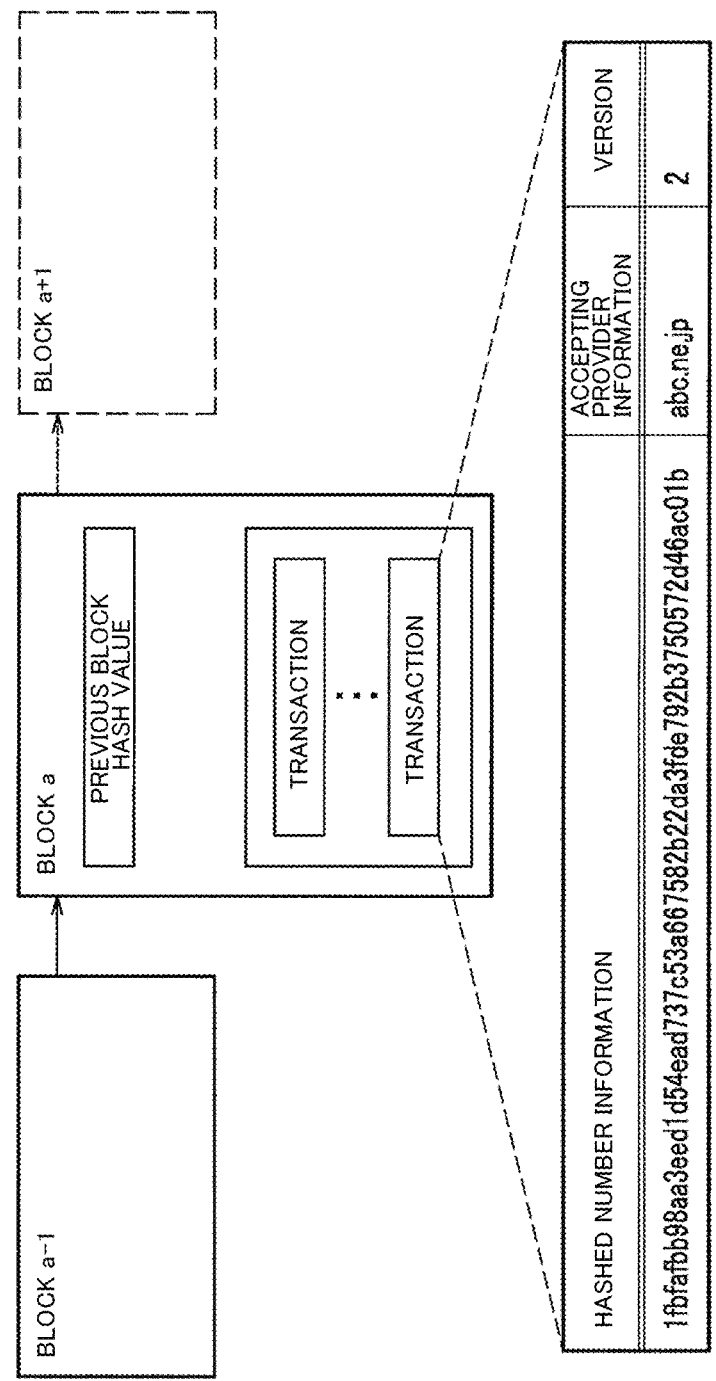
FIG. 8 is a diagram showing blocks stored as a blockchain in a storage unit of each number management apparatus.

Specifically, for example, multiple hash functions are prepared, and the transaction generation unit 112 (FIG. 3) randomly selects a hash function to be used in the current instance at each transaction generation time. At this time, for example, as shown in FIG. 8, information for identifying the hash function used in the current instance ("version information" in the example shown in FIG. 8) may also be included in the transaction. Hash functions that may be used for hashing the telephone number are shared by all of the number management apparatuses 10. Also, information (e.g., a correspondence chart) indicating which hash function the identification information (version information) of the hash function corresponds to may also be held by the number management apparatuses 10, and may be acquired as needed from a database or the like outside of the apparatuses.

During number resolution, the hash computation unit 122 (FIG. 3) hashes a query number using all of the hash functions that may be used for hashing, and generates multiple pieces of hashed query information.

The data management unit 123 searches the transactions in the blockchain using the multiple pieces of hashed query information as keys. Normally, it is thought that even if a search is performed using multiple pieces of hashed query information as keys, one piece of hashed query information will match a piece of hashed number information in a transaction. In this case, the data management unit 123 outputs the connection destination information of the transaction as-is to the query reception unit 121, and the query reception unit 121 transmits the connection destination information to the SIP server or the like, which is the query source.

On the other hand, the likelihood that the result of hashing a different telephone number with a different hash function will be the same value is not zero, and in this case, the data management unit 123 (FIG. 3) extracts multiple transactions. The data management unit 123 outputs the version information together with the connection destination information of the extracted multiple transactions to the query reception unit 121. The query reception unit 121 compares the version information of the hash functions included in the transactions, specifies the transaction corresponding to the query telephone number, and transmits the connection destination information of the transaction to the SIP server or the like, which is the query source.

The transaction generation unit 112 (FIG. 3) may also change the hash function to be used for hashing for each block in which, for example, a transaction is stored (or for every predetermined number of blocks). In this case, the correspondence relationship between the identifier of the block and the identifier of the hash function used for hashing the transaction (telephone number) of the block is shared by all of the number management apparatuses 10.

Although the processing performed during number resolution is the same as that performed in the case of changing the hash function randomly as described above, if multiple transactions are extracted by the data management unit 123, the identifiers of the blocks in which the transactions were included are output together with the connection destination information of the extracted multiple transactions to the query reception unit 121. The query reception unit 121 compares the block identifiers of the transactions, specifies the hash function used for hashing the transaction, and specifies the transaction corresponding to the query telephone number. The processing thereafter is the same as that performed in the case of changing the hash function randomly as described above.

In this manner, by changing the hash function to be used for hashing the telephone number at any timing, it is possible to further improve the confidentiality of the number portability information. For example, even if the number portability information leaks, the information acquirer can analyze only a portion thereof if not all of the multiple hash functions are known, and thus it is possible to make it difficult to use the information.

<<Variation 2>>

Next, Variation 2 of the number management system 1 according to the present embodiment will be described. In the above-described description, the hashed telephone number is generated by hashing the telephone number as-is, but the hashed telephone number may also be generated by performing hashing after adding any character string to the telephone number. Specifically, for example, multiple patterns of random character strings such as abcdef . . . or any character string such as tel: or telephone: are prepared, when a transaction is to be generated, any character string is randomly selected and added as a prefix to the telephone number, and the result is hashed (e.g., if the telephone number is "0422591234", hash computation is performed on the character string "tel:0422591234"). That is, the transaction generation unit 112 (FIG. 3) adds a character string selected from among multiple candidate character strings to the telephone number and hashes the result to generate the hashed number information. Note that the character strings (candidate character strings) that may be added to the telephone number are shared by all of the number management apparatuses 10.

During number resolution, the hash computation unit 122 (FIG. 3) adds all of the candidate character strings to the query telephone number and hashes the results to generate multiple pieces of hashed query information.

The data management unit 123 searches the transactions in the blockchain using the multiple pieces of hashed query information as keys. Normally, it is thought that even if a search is performed using multiple pieces of hashed query information as keys, one piece of hashed query information will match a piece of hashed number information in a transaction. The data management unit 123 outputs the connection destination information of the transaction that was hit in the search to the query reception unit 121, and the query reception unit 121 transmits the connection destination information to the SIP server or the like, which is the query source.

By doing so, for example, the hash values of all of the telephone numbers are calculated in advance, whereby it is possible to make it difficult to perform inverse analysis in which the relationship between the telephone numbers and the connection destination information is determined, and thus it is possible to further improve confidentiality of the number portability information.

<<Variation 3>>

Next, Variation 3 of the number management system 1 according to the present embodiment will be described.

In the number management system 1 according to the present embodiment shown in FIG. 1, an ENUM system was realized due to the number management apparatuses 10 including a function (the function of number resolution unit 12) of responding to the query (request) for connection destination information from the SIP server or the like.

In contrast to this, when the ENUM system is to be realized, the number management system 1a according to Variation 3 of the present embodiment is characterized by executing a function of responding to a query (request) for connection destination information from the SIP server or the like (function of the number resolution unit 12) using an apparatus (ENUM server) separate from the number management apparatus 10.

Figure 9:
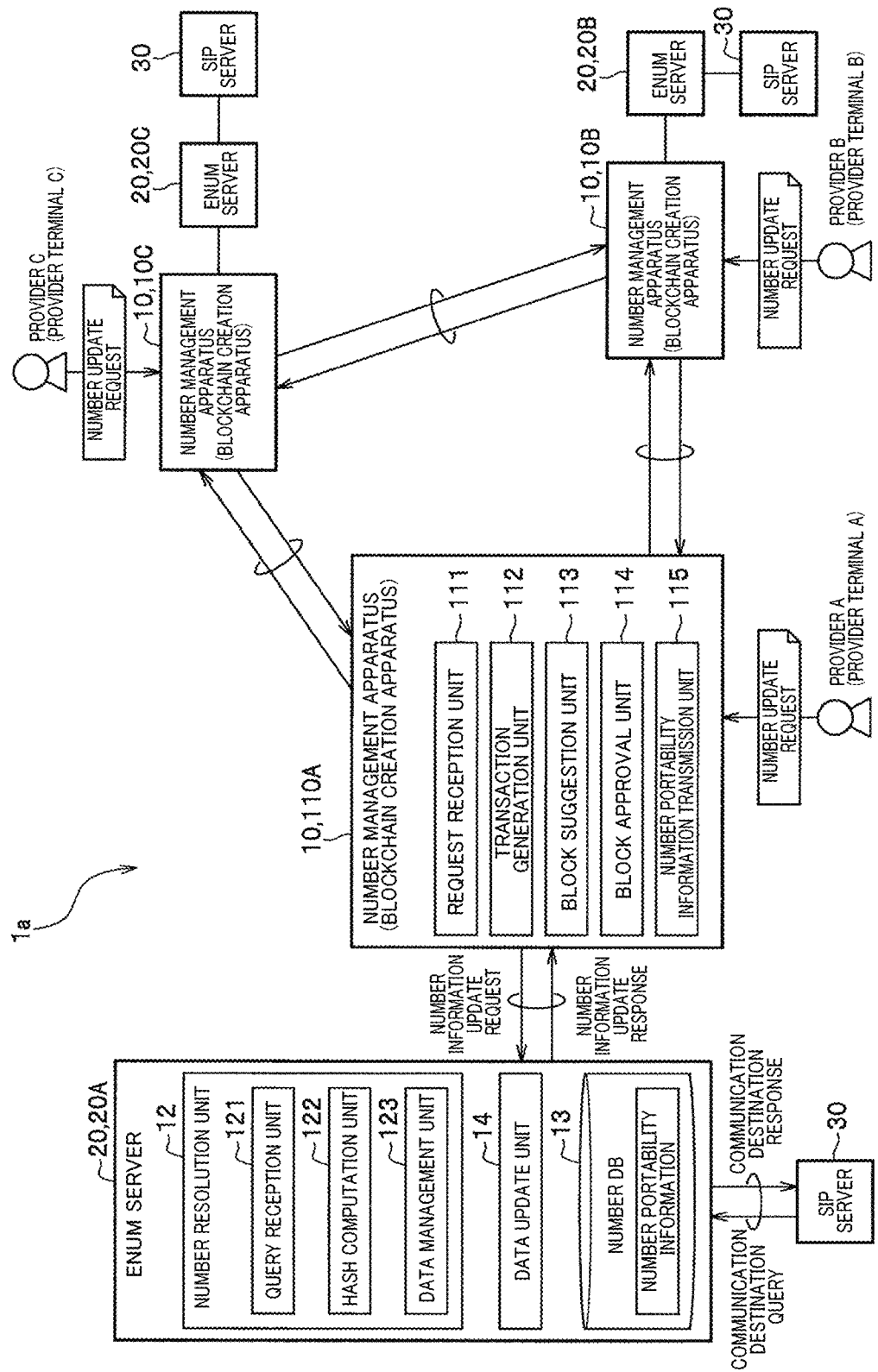
FIG. 9 is a diagram showing an overall configuration of an ENUM system including a number management system according to Variation 3 of the present embodiment.

FIG. 9 is a diagram showing an overall configuration of an ENUM system including a number management system 1a according to Variation 3 of the present embodiment.

As shown in FIG. 9, the number management apparatuses 10 (10A, 10B, 10C) included in the number management system 1a are connected to ENUM servers 20 (20A, 20B, 20C) installed by respective communication providers. The ENUM server 20 includes a data update unit 14 in addition to the configuration of the number resolution unit 12 and the number database 13 shown in FIGS. 1 and 3. Also, the number management apparatus 10 includes a number portability information transmission unit 115 in addition to the configuration of the number management unit 11 shown in FIG. 1. Note that configurations having the same function as the number management apparatuses 10 shown in FIGS. 1 and 3 are denoted by the same reference numerals and names, and description thereof is omitted.

If a new block is stored connected to a blockchain due to the block approval unit 114 approving the suggested block, the number portability information transmission unit 115 extracts the number portability information, which is information of the transactions included in the newly-stored block. The number portability information transmission unit 115 transmits the number information update request including the number portability information to the ENUM server 20 of the communication provider to which the number portability information transmission unit 115 belongs. Also, from the ENUM server 20, the number portability information transmission unit 115 receives a number information update response, which is a response to the number information update request and indicates that the number database has been updated using the transmitted number portability information.

<ENUM Server>

The ENUM server 20 is an apparatus (number resolution apparatus) that receives a query (request) for connection destination information for a telephone number of a terminal serving as a connection destination from the SIP server or the like and sends a response. This ENUM server 20 includes a number resolution unit 12, a data update unit 14, and a number database (DB) 13.

The number resolution unit 12 receives a query from the SIP server or the like, references the number database 13 to extract the connection destination information corresponding to the telephone number indicated by the query, and sends the result to the SIP server or the like as a response.

The data update unit 14 receives a number information update request from the number management apparatus 10 connected to the data update unit 14, and updates the number database 13 using the number portability information included in the number information update request. Then, when the update of the number database 13 is complete, the data update unit 14 transmits the number information update response indicating that the update is complete to the number management apparatus 10.

Figure 10:
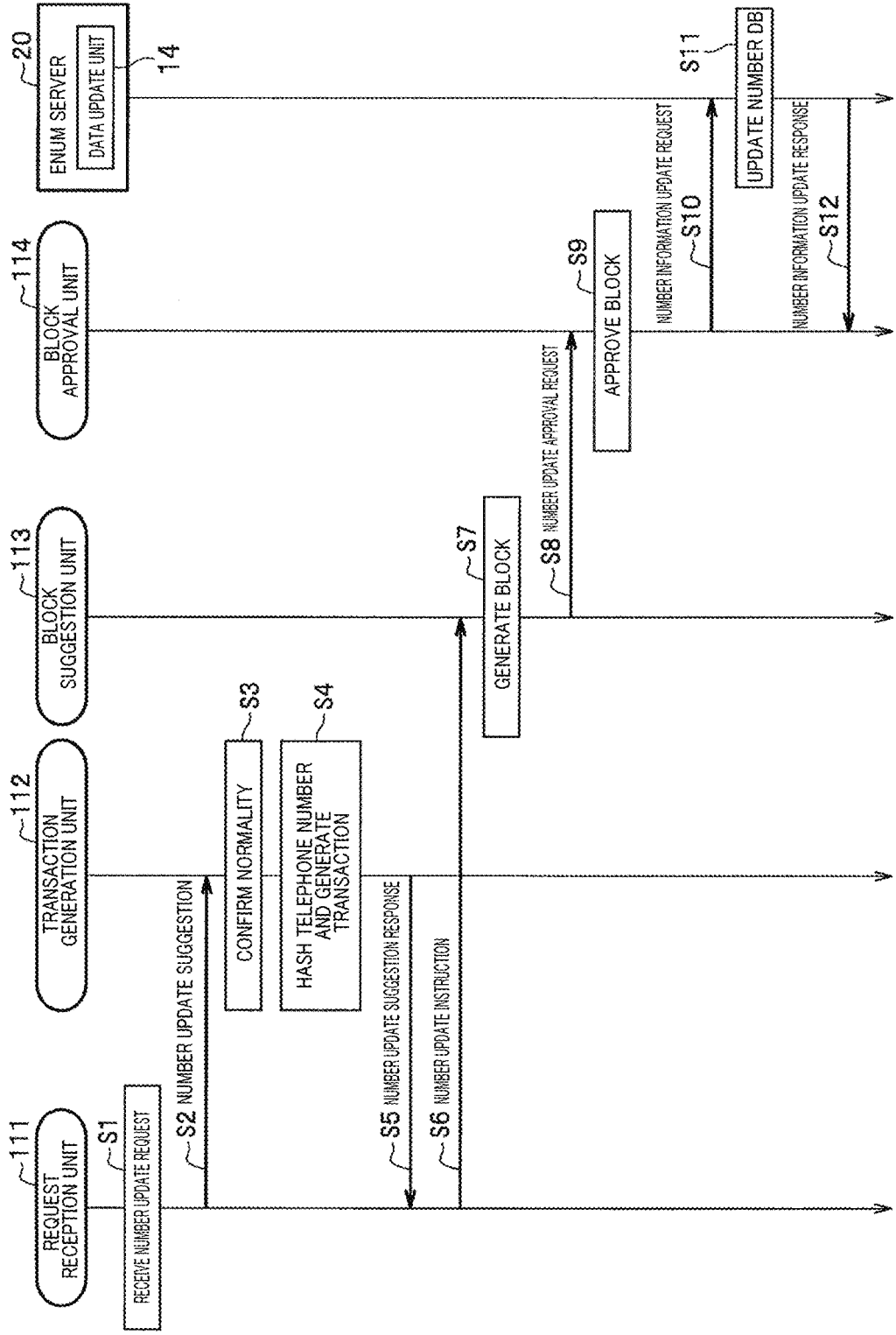
FIG. 10 is a sequence diagram showing a flow of processing performed by the ENUM system including the number management system according to Variation 3 of the present embodiment.
Figure 11:
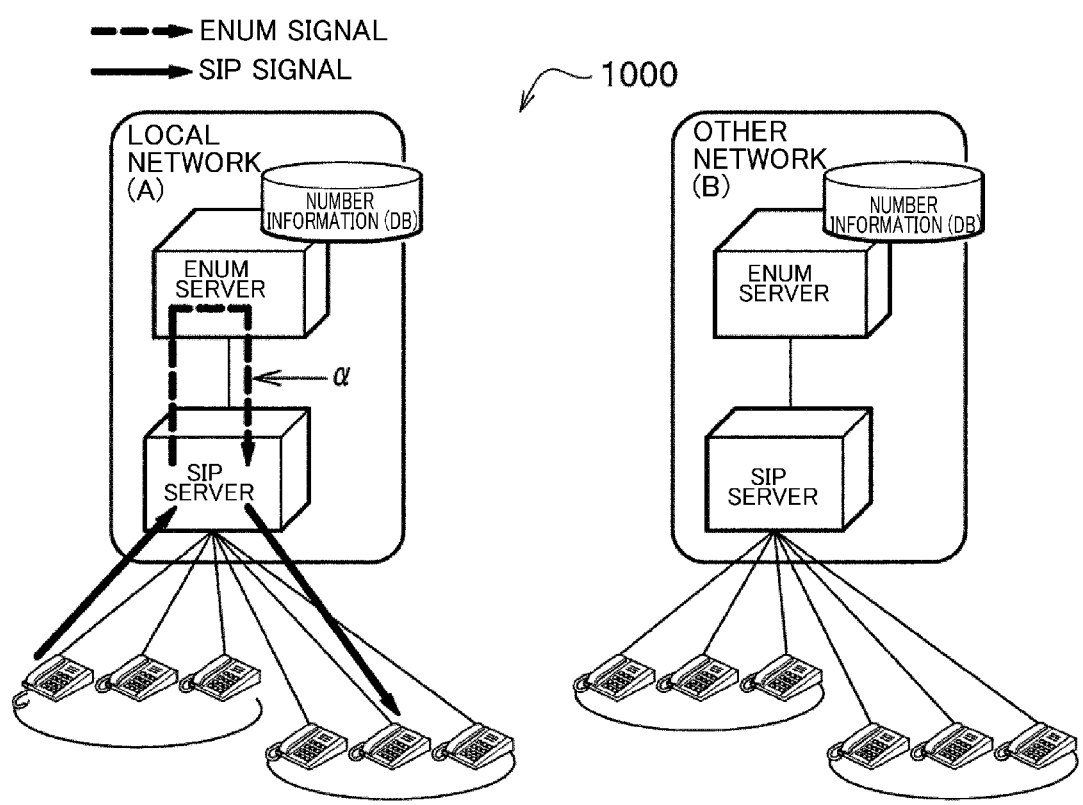
FIG. 11 is a diagram showing an overview of number resolution processing (number in local network) of a conventional ENUM system.
Figure 12:
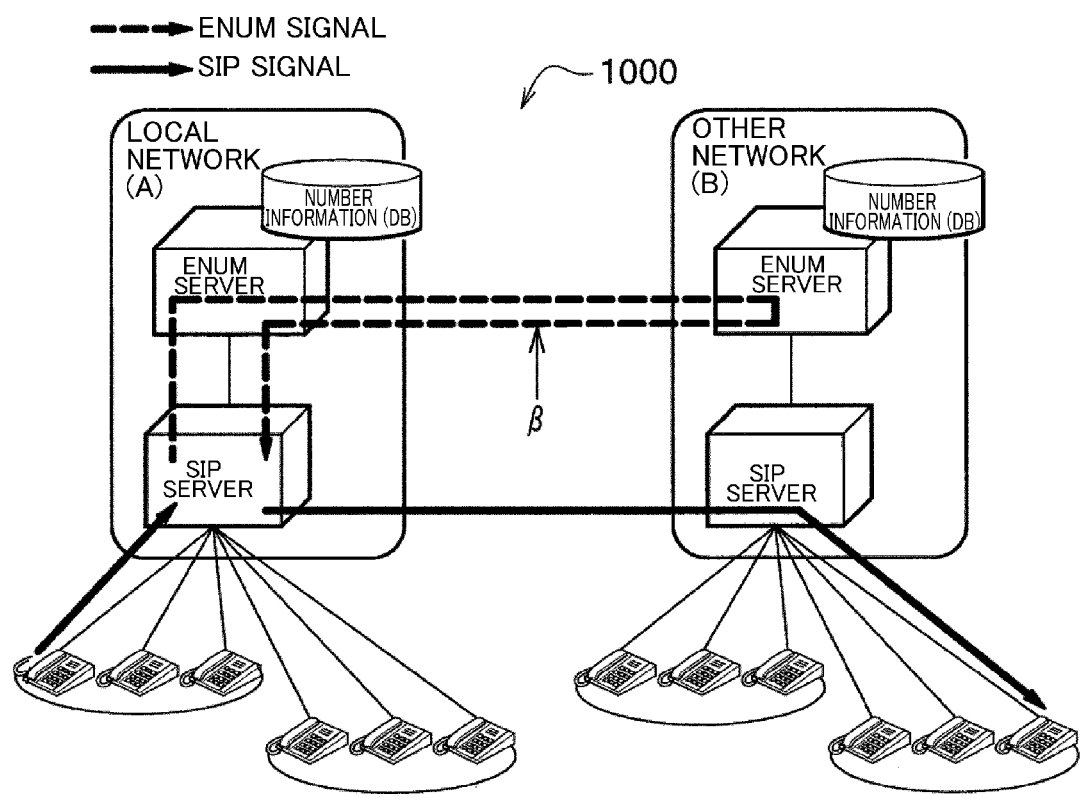
FIG. 12 is a diagram showing an overview of number resolution processing (query to another network) in a conventional ENUM system.

FIG. 10 is a sequence diagram showing a flow of processing of the ENUM system including the number management system 1a according to Variation 3 of the present embodiment. Since the processing (steps S1 to S9) of the number management system 1 indicated by FIG. 6 is the same, the description thereof is omitted.

When the block approval units 114 (FIG. 3) of the number management apparatuses 10 (10A, 10B, 10C) approve the suggested block (step S9), the number portability information transmission units 115 (not shown in FIG. 10) extracts the number portability information, which is information on the transactions included in the blocks that were newly stored in the blockchain. Then, the number portability information transmission unit 115 generates a number information update request including the extracted pieces of number portability information and transmits it to the ENUM server 20 of the communication provider to which the number portability information transmission unit 115 belongs (step S10).

Next, upon receiving the number information update request, the data update units 14 of the ENUM servers 20 updates the number database 13 using the number portability information included in the number information update request (step S11).

Next, when the update of the number database 13 is completed, the data update unit 14 of each ENUM server 20 transmits a number information update response indicating that the update is complete to the number management apparatus 10 (step S12).

Note that the processing performed during number resolution is the same as in the sequence shown in FIG. 7, and therefore description thereof is omitted.

By doing so, the number management apparatuses 10 of the number management system 1a can reflect the updated number portability information in the number database 13 of the ENUM server 20 of the communication provider to which the number management apparatus 10 belongs.

Note that instead of receiving the number update request from the number management apparatus 10, the data update unit 14 of the ENUM server 20 (FIG. 9) may also receive the number portability information from the number portability information transmission unit 115 of the number management apparatus 10 and update the number database 13 by transmitting the acquisition request for the updated number portability information at a predetermined time interval from the data update unit 14.

<<Variation 4>>

Although the block suggestion unit 113 (FIG. 3) was provided in all of the number management apparatuses 10 creating the blockchain in the number management system 1 shown in FIG. 1, in Variation 4, one of the number management apparatuses 10 creating the blockchain is set as the representative (leader) number management apparatus 10. Also, a configuration is used in which the block suggestion unit 113 is included in the representative number management apparatus 10 (e.g., 10A) and the block suggestion unit 113 is not included in the other number management apparatuses 10 (10B, 10C).

With the transaction generation unit 112 (FIG. 3) of each number management apparatus 10 according to the present embodiment, the number update suggestion is received from the request reception unit 111, and a transaction is generated for the number portability information. Thereafter, the request reception unit 111 (or the transaction generation unit 112) transmitted the number update instruction to the block suggestion unit 113 of any number management apparatus 10 creating the blockchain, which was determined based on the predetermined logic (block suggestion unit selection logic).

In contrast to this, with the number management apparatus 10 according to Variation 4 of the present embodiment, the request reception unit 111 (or transaction generation unit 112) of the number management apparatuses 10 (10B, 10C) is characterized by transmitting the number update instruction to the block suggestion unit 113 of the representative number management apparatus 10 (10A). Then, the block suggestion unit 113 of the representative number management apparatus 10 (10A) aggregates the received number update instruction and generates a block including multiple transactions. Next, the block suggestion unit 113 transmits the number update approval request including the generated block to the block approval unit 114 of the number management apparatuses 10 creating in the blockchain.

When the normality of the block included in the number update request is to be confirmed, the block approval unit 114 of the number management apparatus 10 may also confirm the normality, as well as the fact that the transmission source is the representative number management apparatus 10 (10A).

By doing so as well, the number management apparatuses (blockchain creation apparatuses) 10 of the number management system 1 according to Variation 4 of the present embodiment can store the number portability information of all members (communication providers) that participate in the blockchain, instead of the number portability information relating to the telephone number managed by the number management apparatus 10. Accordingly, it is possible to improve the availability of the number portability information that is used in the ENUM system. Also, for example, since the problems (sequentiality, consistency, atomicity) with the agreement form of the dispersed system that occurs in a case in which multiple block suggestion units 113 are present in a blockchain need not be dealt with, it is possible to reduce the processing load and communication load in the overall system.

<<Variation 5>>

Next, Variation 5 of the number management system 1 according to the present embodiment will be described.

The number management system 1 according to the present embodiment (see FIG. 1) is premised not on a publicly-open type of blockchain that anyone can participate in, but on a Permissioned type of blockchain that uses a service in which a blockchain is used among limited members. In this case, communication providers to which telephone numbers have been dispensed by the Ministry of Internal Affairs are envisioned as members who can transmit the number update request to the number management apparatus 10. However, a case is also conceivable in which the Ministry of Internal Affairs dispenses numbers directly to users in the future. In this case, users to whom the Ministry of Internal Affairs has dispensed numbers may also be included in the "Permissioned" targets.

Accordingly, the number management system according to Variation 5 uses a configuration in which not only communication providers but also specific users (user terminals) can transmit number update requests to the number management apparatus 10. Also, if the number management apparatus 10 includes the function of an ENUM server, the number management apparatus 10 may also receive a query about the connection destination information corresponding to the telephone number directly from the user terminal without going through an SIP server of a communication provider, and may resolve the number.

<Effects>

As described above, a number management system of the present invention is a number management system 1 including a plurality of number management apparatuses 10 for managing number portability information including a telephone number and connection destination information for the telephone number, in which the plurality of number management apparatuses 10 each include a number management unit 11 configured to manage the number portability information as a blockchain, and a number resolution unit 12 configured to send the connection destination information corresponding to a query telephone number as a response, the number management unit 11 includes a request reception unit 111 configured to receive a number update request including the number portability information, a transaction generation unit 112 configured to generate a transaction including hashed number information obtained by hashing the telephone number using a predetermined hash function and the connection destination information, a block suggestion unit 113 configured to acquire the transactions generated according to a plurality of said number update requests, generate a newly-suggested block including a transaction group obtained by aggregating the acquired plurality of transactions, and transmit the generated suggested block to the respective plurality of number management apparatuses creating the blockchain, and a block approval unit 114 configured to receive the suggested block, approve the suggested block by confirming a predetermined normality of the suggested block, and store the suggested block by connecting the suggested block to a block stored as the blockchain in a storage unit, and the number resolution unit 12 includes a query reception unit 121 configured to receive a query request including the query telephone number, a hash computation unit 122 configured to generate hashed query information by hashing the query telephone number using the hash function, and a data management unit 123 configured to search transactions in the blockchain using the hashed query information as a key and send the connection destination information corresponding to the query telephone number as a response.

By doing so, each number management apparatus (blockchain configuration apparatus) 10 of the number management system 1 according to the present embodiment can store not only the number portability information relating to the telephone numbers managed by the number management apparatus 10, but also the number portability information of all members (communication providers, etc.) that participate in the blockchain. Accordingly, it is possible to improve the availability of the number portability information that is used in the ENUM system.

Also, according to the number management system 1, due to a portion (telephone number) of the number portability information being hashed and stored in a blockchain, it is possible to improve the confidentiality of the number portability information, and it is possible to reduce the risk of information leakage, which is increased by sharing the number portability information with all members (communication service providers, etc.).

Also, in the number management system 1, the transaction generation unit 112 selects one of a plurality of hash functions set in advance, and generates a transaction including hashed number information obtained by hashing with the selected hash function, a version number for identifying the selected hash function, and the connection destination information, the hash computation unit 122 generates a plurality of pieces of hashed query information by hashing the query telephone number using the respective plurality of hash functions set in advance, and the data management unit 123 searches transactions in the blockchain using the generated plurality of pieces of hashed query information as keys, extracts the connection destination information corresponding to the query telephone number and the version number, if there is one piece of extracted connection destination information, sends the connection destination information as a response, and if there is a plurality of pieces of extracted connection destination information, selects the connection destination information for which the hash function identified by the version number matches the hash function used by the hash computation unit 122, and sends the selected connection destination information as a response.

Due to using multiple hash functions in this manner, it is difficult to specify the hash function used for hashing, and thus it is possible to further improve the confidentiality of the number portability information. For example, even if the number portability information leaks, the information acquirer can analyze only a portion thereof if not all of the multiple hash functions are known, and thus it is possible to make it difficult to use the information.

Also, in the number management system 1, for each said block, the transaction generation unit 112 selects one of a plurality of hash functions set in advance, and generates a transaction including hashed number information obtained by performing hashing with the selected hash function, an identifier of the block in which the transaction including the hashed number information is to be stored, and the connection destination information, the hash computation unit 122 generates a plurality of pieces of hashed query information by hashing the query telephone number using the respective plurality of hash functions set in advance, and the data management unit 123 searches transactions in the blockchain using the generated plurality of pieces of hashed query information as keys, extracts the connection destination information corresponding to the query telephone number and the identifier of the block, if there is one piece of extracted connection destination information, sends the connection destination information as a response, and if there is a plurality of pieces of extracted connection destination information, selects the connection destination information for which the hash function identified by the identifier of the block matches the hash function selected for each block in the transaction generation unit 112 and sends the selected connection destination information as a response.

Due to using different hash functions for each block in this manner, it is difficult to specify the hash function used for hashing, and thus it is possible to further improve the confidentiality of the number portability information. For example, even if the number portability information leaks, the information acquirer can analyze only a portion thereof if not all of the multiple hash functions are known, and thus it is possible to make it difficult to use the information.

Also, in the number management system 1, the transaction generation unit 112 generates the hashed number information by adding a character string selected from among a plurality of candidate character strings to the telephone number and hashing the result, the hash computation unit 122 generates a plurality of pieces of the hashed query information obtained by adding a plurality of the candidate character strings to the query telephone number and hashing the results, and the data management unit 123 searches transactions in the blockchain using the generated plurality of pieces of hashed query information as keys, and sends the connection destination information corresponding to the hashed query information as a response.

By doing so, for example, the hash values of all of the telephone numbers are calculated in advance, whereby it is possible to make it difficult to perform inverse analysis in which the relationship between the telephone numbers and the connection destination information is determined, and thus it is possible to further improve confidentiality of the number portability information.

Note that the number management system 1, the number management method, and the number management apparatus 10 according to the present invention is not limited to the above-described embodiments and variations, and changes can be implemented in a range that does not depart from the gist of the present invention.

For example, in the present embodiment, the number portability information was described as a set of a telephone number and changed connection destination information (accepting provider information). In addition to this, for example, the number portability information may also be formed as a set composed of a telephone number, unchanged accepting provider information, and changed accepting provider information. In this case as well, effects similar to those of the present embodiment can be exhibited.

REFERENCE SIGNS LIST 1, 1a Number management system
10 (10A, 10B, 10C) Number management apparatus
11 Number management unit
12 Number resolution unit
13 Number database
14 Data update unit
20 ENUM server
111 Request reception unit
112 Transaction generation unit
113 Block suggestion unit
114 Block approval unit
115 Number portability information transmission unit
121 Query reception unit
122 Hash computation unit
123 Data management unit

The invention claimed is:

1. A number management system including a plurality of number management apparatuses for managing number portability information including a telephone number and connection destination information for the telephone number,
wherein the plurality of number management apparatuses each include a number management unit, including one or more processors, configured to manage the number portability information as a blockchain, and a number resolution unit, including one or more processors, configured to send the connection destination information corresponding to a query telephone number as a response,
the number management unit includes
a request reception unit, including one or more processors, configured to receive a number update request including the number portability information,
a transaction generation unit, including one or more processors, configured to generate a transaction including hashed number information obtained by hashing the telephone number using a predetermined hash function and the connection destination information,
a block suggestion unit, including one or more processors, configured to acquire the transactions generated according to a plurality of said number update requests, generate a newly-suggested block including a transaction group obtained by aggregating a acquired plurality of transactions, and transmit the generated suggested block to the respective plurality of number management apparatuses creating the blockchain, and
a block approval unit, including one or more processors, configured to receive the suggested block, approve the suggested block by confirming a predetermined normality of the suggested block, and store the suggested block by connecting the suggested block to a block stored as the blockchain in a storage unit, and
the number resolution unit includes
a query reception unit, including one or more processors, configured to receive a query request including the query telephone number,
a hash computation unit, including one or more processors, configured to generate hashed query information by hashing the query telephone number using the hash function, and
a data management unit, including one or more processors, configured to search transactions in the blockchain using the hashed query information as a key and send the connection destination information corresponding to the query telephone number as a response.

2. The number management system according to claim 1, wherein
the transaction generation unit is configured to select one of a plurality of hash functions set in advance, and generate a transaction including hashed number information obtained by hashing with the selected hash function, a version number for identifying the selected hash function, and the connection destination information,
the hash computation unit is configured to generate a plurality of pieces of hashed query information by hashing the query telephone number using the respective plurality of hash functions set in advance, and
the data management unit is configured to search transactions in the blockchain using the generated plurality of pieces of hashed query information as keys, extract the connection destination information corresponding to the query telephone number and the version number, if there is one piece of extracted connection destination information, send the connection destination information as a response, and if there is a plurality of pieces of extracted connection destination information, select the connection destination information for which the hash function identified by the version number matches the hash function used by the hash computation unit, and send the selected connection destination information as a response.

3. The number management system according to claim 1, wherein for each said block, the transaction generation unit is configured to select one of a plurality of hash functions set in advance, and generate a transaction including hashed number information obtained by performing hashing with the selected hash function, an identifier of the block in which the transaction including the hashed number information is to be stored, and the connection destination information, the hash computation unit is configured to generate a plurality of pieces of hashed query information by hashing the query telephone number using the respective plurality of hash functions set in advance, and the data management unit is configured to search transactions in the blockchain using the generated plurality of pieces of hashed query information as keys, extract the connection destination information corresponding to the query telephone number and the identifier of the block, if there is one piece of extracted connection destination information, send the connection destination information as a response, and if there is a plurality of pieces of extracted connection destination information, select the connection destination information for which the hash function identified by the identifier of the block matches the hash function selected for each block in the transaction generation unit and send the selected connection destination information as a response.

4. The number management system according to claim 1, wherein the transaction generation unit is configured to generate the hashed number information by adding a character string selected from among a plurality of candidate character strings to the telephone number and hashing the result, the hash computation unit is configured to generate a plurality of pieces of the hashed query information obtained by adding a plurality of the candidate character strings to the query telephone number and hashing the results, and the data management unit is configured to search transactions in the blockchain using the generated plurality of pieces of hashed query information as keys, and send the connection destination information corresponding to the hashed query information as a response.

5. A number management method for a number management system including a plurality of number management apparatuses for managing number portability information including a telephone number and connection destination information for the telephone number, the method comprising:

receiving, by a number management apparatus, a number update request including the number portability information, generating, by the number management apparatus, a transaction including hashed number information obtained by hashing the telephone number using a predetermined hash function and the connection destination information;

acquiring, by the number management apparatus, the transactions generated according to a plurality of said number update requests, generating a newly-suggested block including a transaction group obtained by aggregating the acquired plurality of transactions, and transmitting the generated suggested block to the respective plurality of number management apparatuses creating a blockchain;

receiving, by the number management apparatus, the suggested block, approving the suggested block by confirming a predetermined normality of the suggested block, and storing the suggested block by connecting the suggested block to a block stored as the blockchain in a storage unit;

receiving, by the number management apparatus, a query request requesting the connection destination information corresponding to a query telephone number;

generating, by the number management apparatus, hashed query information by hashing the query telephone number using the hash function; and searching, by the number management apparatus, transactions in the blockchain using the hashed query information as a key and sending the connection destination information corresponding to the query telephone number as a response.

6. The number management method according to claim 5, selecting one of a plurality of hash functions set in advance, and generating a transaction including hashed number information obtained by hashing with the selected hash function, a version number for identifying the selected hash function, and the connection destination information, generating a plurality of pieces of hashed query information by hashing the query telephone number using the respective plurality of hash functions set in advance, and searching transactions in the blockchain using the generated plurality of pieces of hashed query information as keys, extracting the connection destination information corresponding to the query telephone number and the version number, if there is one piece of extracted connection destination information, sending the connection destination information as a response, and if there is a plurality of pieces of extracted connection destination information, selecting the connection destination information for which the hash function identified by the version number matches the hash function, and sending the selected connection destination information as a response.

7. The number management method according to claim 5, wherein for each said block, selecting one of a plurality of hash functions set in advance, and generating a transaction including hashed number information obtained by performing hashing with the selected hash function, an identifier of the block in which the transaction including the hashed number information is to be stored, and the connection destination information, generating a plurality of pieces of hashed query information by hashing the query telephone number using the respective plurality of hash functions set in advance, and searching transactions in the blockchain using the generated plurality of pieces of hashed query information as keys, extracting the connection destination information corresponding to the query telephone number and the identifier of the block, if there is one piece of extracted connection destination information, sending the connection destination information as a response, and if there is a plurality of pieces of extracted connection destination information, selecting the connection destination information for which the hash function identified by the identifier of the block matches the hash function selected for each block and sending the selected connection destination information as a response.

8. The number management method according to claim 5, wherein
generating the hashed number information by adding a character string selected from among a plurality of candidate character strings to the telephone number and hashing the result,
generating a plurality of pieces of the hashed query information obtained by adding a plurality of the candidate character strings to the query telephone number and hashing the results, and
searching transactions in the blockchain using the generated plurality of pieces of hashed query information as keys, and sending the connection destination information corresponding to the hashed query information as a response.

9. A number management apparatus in a number management system including a plurality of the number management apparatuses for managing number portability information including a telephone number and connection destination information for the telephone number,
wherein the number management apparatus includes a number management unit including one or more processors, configured to manage the number portability information as a blockchain and a number resolution unit, including one or more processors, configured to send the connection destination information corresponding to a query telephone number as response,
the number management unit includes
a request reception unit, including one or more processors, configured to receive a number update request including the number portability information,
a transaction generation unit, including one or more processors, configured to generate a transaction including hashed number information obtained by hashing the telephone number using a predetermined hash function and the connection destination information,
a block suggestion unit, including one or more processors, configured to acquire the transactions generated according to a plurality of said number update requests, generate a newly-suggested block including a transaction group obtained by aggregating the acquired plurality of transactions, and transmit the generated suggested block to the respective plurality of number management apparatuses creating the blockchain, and
a block approval unit, including one or more processors, configured to receive the suggested block, approve the suggested block by confirming a predetermined normality of the suggested block, and store the suggested block by connecting the suggested block to a block stored as the blockchain in a storage unit, and
the number resolution unit includes
a query reception unit, including one or more processors, configured to receive a query request including the query telephone number,
a hash computation unit, including one or more processors, configured to generate hashed query information by hashing the query telephone number using the hash function, and a data management unit, including one or more processors, configured to search transactions in the blockchain using the hashed query information as a key and send the connection destination information corresponding to the query telephone number as a response.

10. The number management apparatus according to claim 9, wherein
the transaction generation unit is configured to select one of a plurality of hash functions set in advance, and generate a transaction including hashed number information obtained by hashing with the selected hash function, a version number for identifying the selected hash function, and the connection destination information,
the hash computation unit is configured to generate a plurality of pieces of hashed query information by hashing the query telephone number using the respective plurality of hash functions set in advance, and
the data management unit is configured to search transactions in the blockchain using the generated plurality of pieces of hashed query information as keys, extract the connection destination information corresponding to the query telephone number and the version number, if there is one piece of extracted connection destination information, send the connection destination information as a response, and if there is a plurality of pieces of extracted connection destination information, select the connection destination information for which the hash function identified by the version number matches the hash function used by the hash computation unit, and send the selected connection destination information as a response.

11. The number management apparatus according to claim 9, wherein
for each said block, the transaction generation unit is configured to select one of a plurality of hash functions set in advance, and generate a transaction including hashed number information obtained by performing hashing with the selected hash function, an identifier of the block in which the transaction including the hashed number information is to be stored, and the connection destination information,
the hash computation unit is configured to generate a plurality of pieces of hashed query information by hashing the query telephone number using the respective plurality of hash functions set in advance, and
the data management unit is configured to search transactions in the blockchain using the generated plurality of pieces of hashed query information as keys, extract the connection destination information corresponding to the query telephone number and the identifier of the block, if there is one piece of extracted connection destination information, send the connection destination information as a response, and if there is a plurality of pieces of extracted connection destination information, select the connection destination information for which the hash function identified by the identifier of the block matches the hash function selected for each block in the transaction generation unit and send the selected connection destination information as a response.

12. The number management apparatus according to claim 9, wherein
the transaction generation unit is configured to generate the hashed number information by adding a character string selected from among a plurality of candidate character strings to the telephone number and hashing the result, the hash computation unit is configured to generate a plurality of pieces of the hashed query information obtained by adding a plurality of the candidate character strings to the query telephone number and hashing the results, and the data management unit is configured to search transactions in the blockchain using the generated plurality of pieces of hashed query information as keys, and send the connection destination information corresponding to the hashed query information as a response.

\* \* \* \* \*